June 1, 1943.  J. W. MacCLATCHIE  2,320,975
PISTON
Filed Dec. 30, 1941

INVENTOR.
JOHN W MacCLATCHIE
BY Robert M. McManigal
ATTORNEY.

Patented June 1, 1943

2,320,975

UNITED STATES PATENT OFFICE 2,320,975

PISTON

John W. MacClatchie, Los Angeles, Calif., assignor to MacClatchie Manufacturing Company of California, Compton, Calif., a corporation of California Application December 30, 1941, Serial No. 424,886

7 Claims. (Cl. 309—4)

This invention relates to improvements in pistons for mud pumps and the like which are adapted for high pressure operations.

More particularly this invention relates to that type of piston in which packing elements of resilient material are mounted on an axial support with an abutment projecting radially from the axial support which forms a backing for the packing elements. I have found that when this type of piston is used in high pressure operations with the use of only usual sealing means between the parts thereof, that fluid will leak between both the axial support and the packing elements and between the radial abutment and the inner ends of the packing elements, with the result that the useful life of the piston is quite short.

The object of my invention is to provide a piston which is capable of withstanding considerable use at high pressures.

Another object of my invention is to provide both a primary seal and a secondary seal for sealing off said packing elements with respect to both said axial support and said radial abutment.

Another object of my invention is to provide each of the packing elements with an annular groove, said groove being adjacent to either the axial support or the radial abutment so that any fluid leaking between the axial support and the packing element will expand the grooves and provide fluid tight seals between the abutment and the packing members and to provide a secondary seal for sealing off said packing elements with respect to said radial abutment.

Another object of my invention is to provide each of the packing elements with an annular groove, said groove being adjacent to either the axial support or the radial abutment so that any fluid leaking between the axial support and the packing element will expand the grooves and provide fluid tight seals between the abutment and the packing members to reinforce the inner end of each of said packing elements with a metallic plate and to provide resilient material between the inner ends of each of said metallic plates and said radial abutment in order to provide a secondary seal against leakage.

My invention has many other objects, advantages, and features, some of which, with the foregoing, will be set forth in the following description where I shall outline one form of my invention, which I have selected for illustration in the drawing accompanying and forming a part of the present specification.

Referring to the drawing.

Figure 1:
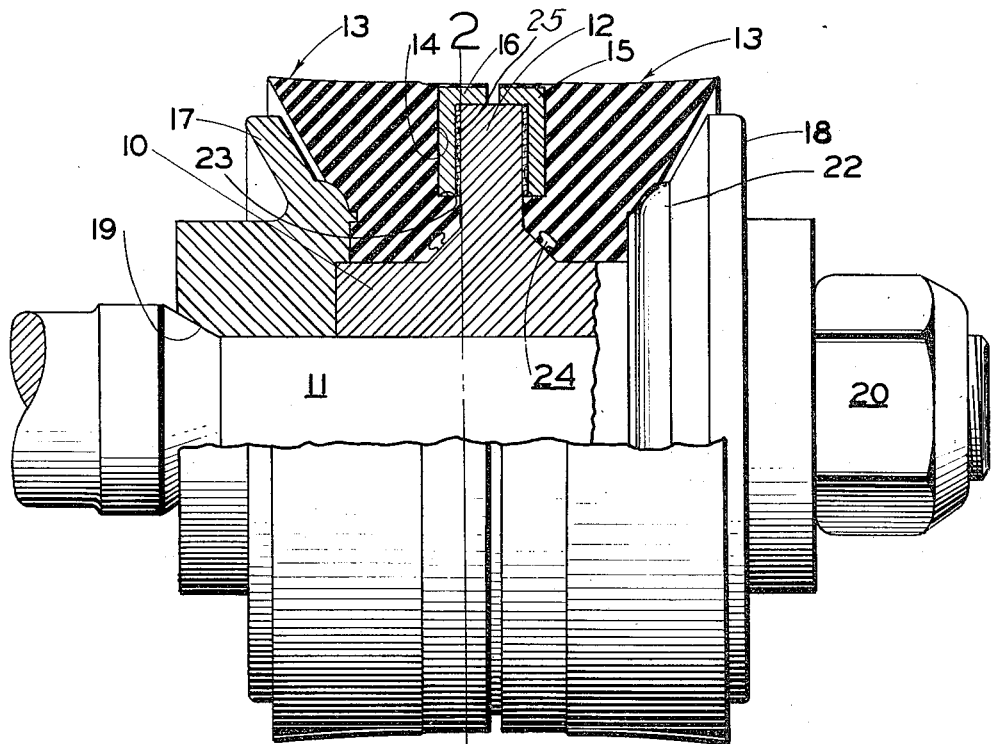
Figure 1 is a side elevational view of a piston embodying the invention, partly in section.
Figure 2:
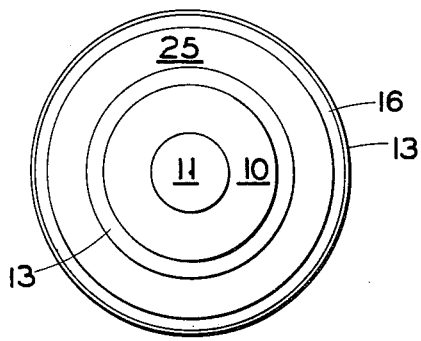
Figure 2 is a section taken along the line 2—2 of Figure 1.

The invention is illustrated embodied in a double acting piston, which comprises a hub 10 mounted on a piston rod 11. A radial flange 12 projects integrally from the hub 10 intermediate the ends of said hub. Mounted on the hub 10 on each side of flange 12 are packing elements 13, which may be formed of rubber or other suitable resilient material. The flange 12 forms a longitudinal backing for each of the packing elements 13. I prefer to reinforce the inner end 14 of each of the packing elements 13 with a metallic plate 15 having a flanged portion 16.

The packing elements are secured on the hub 10 by follower plates 17, 18 which are mounted on the piston rod 11 at the outer ends of the packing elements 13. In the example shown, the follower plate 17 is wedged on the piston rod as indicated at 19, the hub 10 is mounted on the piston rod 11 and the follower plate 18 is secured on said rod by means of a retaining nut 20.

In order to provide a rigid backing for the packing element 13, I prefer to have the outer radial ends 22 of the follower plates 17, 18 extend out at least as far—and preferably further—than the inner radial ends 23 of the reinforcement plates 15.

Figure 3:
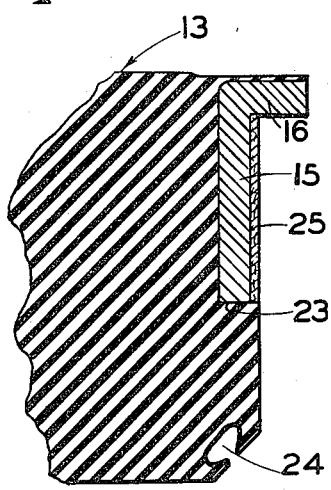
Figure 3 is a sectional view of a portion of one of the packing elements in unassembled position.

Means are provided to positively seal off the packing elements with respect to either the axial support or the radially projecting flange 12. As an instance of this arrangement, the lower portions of the packing elements 13 are provided with annular grooves 24, Fig. 3, adjacent the radial flange 12, the sides of which grooves adjacent the radial flange are adapted to be expanded by fluid pressure to seal off said flange with respect to said packing members. Any fluid passing between the hub 10 and the adjacent side of the packing element 13 which could otherwise escape between the radial flange 12 and the inner end 14 of said packing element 13 and thereby cut-out and damage said parts, passes into the annular groove 24, thereby expanding the sides of said groove adjacent the radial flange 12 into fluid-tight engagement with said flange and sealing off said packing elements with respect to said flange.

However, I have found that in order to provide a piston capable of withstanding considerable use at high pressure operations that it is necessary to provide secondary seals between the metallic plates 15 and the flange 12.

Means are therefore provided to effect secondary seals between said elements. As an instance of this arrangement a fabric, leather or resilient material is provided between the metallic plates 15 and the flange 12. In the example shown in the drawing fabric 25 of heavy woven cloth and impregnated with rubber is molded to the metallic plates 15 at the same time that the packing is molded to said plates.

I have found that both the primary and secondary seals are necessary in preventing fluid from passing through the component parts of the piston when the piston is used in pumps operating at high pressures, that is, pressures in excess of fifteen hundred pounds per square inch. The primary and secondary seals cooperate to attain the desired results.

Pistons embodying the features of my invention have given excellent results and are capable of withstanding considerable use even when used on mud pumps operated at extremely high pressures.

From the foregoing description taken in connection with the accompanying drawing, the construction, operation, uses and advantages of my invention will be readily understood by those skilled in the art to which the invention appertains. While I have described the form of my invention which I now consider to be the best embodiment thereof, I desire to have it understood that the form shown is merely illustrative and that the invention is not to be limited to the details disclosed herein, but is to be accorded the full scope of the appended claims.

I claim:

1. In a pump piston adapted for use at high pressures, a hub, a radially projecting flange medial of the length of the hub and fixed against longitudinal displacement relative thereto, annular packing elements mounted on the hub with the radially projecting flange forming a longitudinal backing for the packing elements, each of said packing elements having an annular groove to seal off said packing elements with respect to said radially projecting flange, secondary seals between said packing elements and said radially projecting flange, and followers for securing said packing elements against said radially projecting flange.

2. In a pump piston, capable of use at high pressures, a hub, a radially projecting flange medial of the length of said hub and integral with said hub, annular packing elements mounted on the hub with the radially projecting flange forming a longitudinal backing for the packing elements, said packing elements having annular grooves adjacent said radially projecting flange, the sides of said grooves adjacent said radially projecting flange being adapted to be expanded by fluid pressure to seal off said packing members and said flange, secondary seals between said packing elements and said flange, and followers for clamping said packing elements against said radially projecting flange.

3. In a pump piston, adapted for high pressure operations, a hub, a radially projecting flange medial of the length of said hub and fixed against longitudinal displacement relative thereto, annular packing elements mounted on the hub with the radially projecting flange forming a longitudinal backing for the packing elements, each of the inner ends of said packing elements having a metallic reinforcement plate and having an annular groove, the sides of said grooves adjacent said radially projecting flange being adapted to be expanded by fluid pressure to seal off said packing members and said flange, secondary seals between said packing members and said flange, and followers for securing the packing elements against the radially projecting flange, the outer ends of said followers being at least as far out radially as the inner ends of said reinforcement material.

4. In a pump piston, adapted for use at high pressures, a hub, a radially projecting flange medial of the length of the hub and fixed against longitudinal displacement relative thereto, annular packing elements mounted on the hub with the radially projecting flange forming a longitudinal backing for the packing elements, each of said packing elements having an annular groove to seal off said packing elements with respect to said radially projecting flange, and a metallic plate, secondary seals comprising resilient material between said packing elements and said radially projecting flange, and followers for securing said packing elements against said radially projecting flange.

5. In a pump piston, capable of use at high pressures, a hub, a radially projecting flange medial of the length of said hub and integral with said hub, annular packing elements mounted on the hub with the radially projecting flange forming a longitudinal backing for the packing elements, said packing elements having annular grooves adjacent said radially projecting flange, and a metallic reinforcement plate, the sides of said grooves adjacent said radially projecting flange being adapted to be expanded by fluid pressure to seal off said packing members and said flange, secondary seals comprising fabric material impregnated with resilient material molded to the metallic plates between said packing elements and said radially projecting flange, and followers for clamping said packing elements against said radially projecting flange.

6. In a pump piston, adapted for high pressure operations, a hub, a radially projecting flange medial of the length of said hub and fixed against longitudinal displacement relative thereto, annular packing elements mounted on the hub with the radially projecting flange forming a longitudinal backing for the packing elements, each of the inner ends of said packing elements having a metallic reinforcement plate and having an annular groove, the sides of said grooves adjacent said radially projecting flange being adapted to be expanded by fluid pressure to seal off said packing members and said flange, secondary seals comprising resilient material between said packing elements and said radially projecting flange, and followers for securing the packing elements against the radially projecting flange, the outer ends of said followers being at least as far out radially as the inner ends of said reinforcement material.

7. In a pump piston, adapted for use at high pressures, a hub, a radially projecting flange medial of the length of the hub and fixed against longitudinal displacement relative thereto, annular packing elements mounted on the hub with the radially projecting flange forming a longitudinal backing for the packing elements, each of said packing elements having a metallic reinforcement plate, a primary seal between said packing elements and said radially projecting flange, secondary seals comprising resilient material between said packing elements and said radially projecting flange, and followers for securing said packing elements against said radially projecting flange.

JOHN W. MacCLATCHIE.